US011731662B2

(12) United States Patent
Wyffels et al.

(10) Patent No.: US 11,731,662 B2
(45) Date of Patent: Aug. 22, 2023

(54) AUTONOMOUS VEHICLE SYSTEM FOR DETECTING PEDESTRIAN PRESENCE

(71) Applicant: FORD GLOBAL TECHNOLOGIES, LLC, Dearborn, MI (US)

(72) Inventors: Kevin Lee Wyffels, Livonia, MI (US); G. Peter K. Carr, Allison Park, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 17/066,253

(22) Filed: Oct. 8, 2020

(65) Prior Publication Data

US 2022/0111873 A1 Apr. 14, 2022

(51) Int. Cl.
*B60W 60/00* (2020.01)
*G08B 29/18* (2006.01)
(Continued)

(52) U.S. Cl.
CPC ...... *B60W 60/00274* (2020.02); *B60W 10/18* (2013.01); *B60W 30/09* (2013.01); *B60W 60/0017* (2020.02); *G06N 7/01* (2023.01); *G06V 20/58* (2022.01); *G06V 40/10* (2022.01); *G08B 29/185* (2013.01); *B60W 2554/4029* (2020.02)

(58) Field of Classification Search
None
See application file for complete search history.

(56) References Cited

U.S. PATENT DOCUMENTS 9,315,192 B1  4/2016  Zhu et al.
9,336,436 B1  5/2016  Dowdall
(Continued)

FOREIGN PATENT DOCUMENTS

JP  2013-214230 A  10/2013
JP  2016223872 A  12/2016
(Continued)

OTHER PUBLICATIONS

2) Dr. Marcel B. Finan—"Logistic Functions", Arkansas Tech University- snapshot Oct. 13, 2017 (Year: 2017).*
(Continued)

*Primary Examiner* — James J Lee
*Assistant Examiner* — David Hatch
(74) *Attorney, Agent, or Firm* — Frank MacKenzie; Brooks Kushman P.C.

(57) ABSTRACT

A system may receive point cloud data that includes one or more data points associated with an object that was detected by sensors of an autonomous vehicle. The system may identify a subset of the point cloud data having data points that are associated with a likelihood of a pedestrian entering a scene with the object, determine a current probability value using a logistic function that is associated with the subset of the point cloud data, determine, based at least in part on the current probability value, a probability value representing a likelihood of the pedestrian actually being present for the subset of the point cloud data, determine whether the probability value exceeds a false alarm threshold value, and in response to the probability value exceeding the false alarm threshold value, assign data points of the subset an attribute value indicative of the pedestrian being present.

17 Claims, 6 Drawing Sheets

(51) Int. Cl.
  *B60W 10/18* (2012.01)
  *B60W 30/09* (2012.01)
  *G06V 20/58* (2022.01)
  *G06V 40/10* (2022.01)
  *G06N 7/01* (2023.01)

(56) References Cited

U.S. PATENT DOCUMENTS

| | | |
|---|---|---|
| 9,443,163 B2 | 9/2016 | Springer |
| 9,600,768 B1 | 3/2017 | Ferguson |
| 9,857,795 B2 | 1/2018 | Gupta et al. |
| 10,395,144 B2 | 8/2019 | Zeng et al. |
| 10,410,352 B1 | 9/2019 | Kim et al. |
| 10,599,154 B2 | 3/2020 | Dean et al. |
| 11,210,537 B2 | 12/2021 | Koivisto et al. |
| 2005/0125154 A1 | 6/2005 | Kawasaki |
| 2016/0012282 A1 | 1/2016 | Shima et al. |
| 2019/0026597 A1 | 1/2019 | Zeng et al. |
| 2019/0086549 A1* | 3/2019 | Ushani ................ G05D 1/0088 |
| 2019/0258878 A1 | 8/2019 | Koivisto et al. |
| 2020/0034634 A1 | 1/2020 | Warshauer-Baker et al. |
| 2020/0226430 A1* | 7/2020 | Ahuja ................. G05D 1/0214 |
| 2020/0307605 A1 | 10/2020 | Morita et al. |
| 2020/0331465 A1 | 10/2020 | Herman et al. |
| 2021/0157006 A1* | 5/2021 | Sun ........................ G06N 3/02 |
| 2021/0158696 A1 | 5/2021 | McNew |
| 2021/0209785 A1 | 7/2021 | Unnikrishnan et al. |
| 2022/0012988 A1* | 1/2022 | Avadhanam ............. G08B 3/10 |
| 2022/0063662 A1* | 3/2022 | Sprunk ............. B60W 60/0011 |

FOREIGN PATENT DOCUMENTS

| | | |
|---|---|---|
| KR | 1020180070258 A | 6/2018 |
| WO | 2007-110654 A1 | 10/2007 |

OTHER PUBLICATIONS

Darms, et al.; "Classification and Tracking of Dynamic Objects with Multiple Sensors for Autonomous Driving in Urban Envrionments," pp. 1-6.

Otto, C., "Fusion of Data from Heterogeneous Sensors with Distributed Fields of View and Situation Evaluation for Advanced Driver Assistance Systems," Scientific Publishing, pp. 1-262, Jun. 6, 2013.

Aeberhard, M. et al., "Object-Level Fusion for Surround Environment Perception in Automated Driving Applications," Faculty of Electrical Engineering and Information Technology at Technische Universitat Dortmund, pp. 1-221, May 31, 2017.

Koch, W., "Advanced Sensor and Dynamics Models with an Application to Sensor Management," www.intechopen.com, pp. 1-18, Feb. 2009.

* cited by examiner

AUTONOMOUS VEHICLE SYSTEM FOR DETECTING PEDESTRIAN PRESENCE

BACKGROUND

It is important to the operation of autonomous vehicles to be able to predict or forecast behavior of actors and other moving or stationary objects in an environment. This is especially true when the actors are pedestrians, who demand increased caution from an autonomous vehicle to maintain a sufficient level of safety. However, due to complex sensor-to-object and inter-object geometries, it is not always practical to cleanly separate pedestrians from other actors and objects in a scene to form unique pedestrian tracks.

This document describes methods and systems that are directed to addressing the problems described above, and/or other issues.

SUMMARY

In some implementations, a system includes an electronic device and a computer-readable storage medium having one or more programming instructions that, when executed, cause the electronic device to perform one or more actions. The system may receive point cloud data that includes one or more data points associated with an object that was detected by one or more sensors of an autonomous vehicle. The one or more data points are each associated with an object type label. The system may identify a subset of the point cloud data having one or more of the one or more data points that are associated with a likelihood of a pedestrian entering a scene with the object, determine a current probability value using a logistic function that is associated with the subset of the point cloud data, determine, based at least in part on the current probability value, a probability value representing a likelihood of the pedestrian actually being present for the subset of the point cloud data, determine whether the probability value exceeds a false alarm threshold value, and in response to the probability value exceeding the false alarm threshold value, assign one or more data points of the subset an attribute value indicative of the pedestrian being present.

In some implementations, the system may execute one or more vehicle control instructions that cause the autonomous vehicle to adjust one or more driving operations based on the attribute value. Optionally, the system may execute one or more vehicle control instructions that cause the autonomous vehicle to apply one or more brakes of the autonomous vehicle when the autonomous vehicle approaches an object having the attribute value.

In some implementations, the current probability value may be associated with data at a current time.

In some implementations, the system may tune the logistic function such that an inflection point is set to the false alarm threshold value. The false alarm threshold value may be specified by a user.

In some implementations, the system may determine the probability value by applying a binary Bayes filter.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
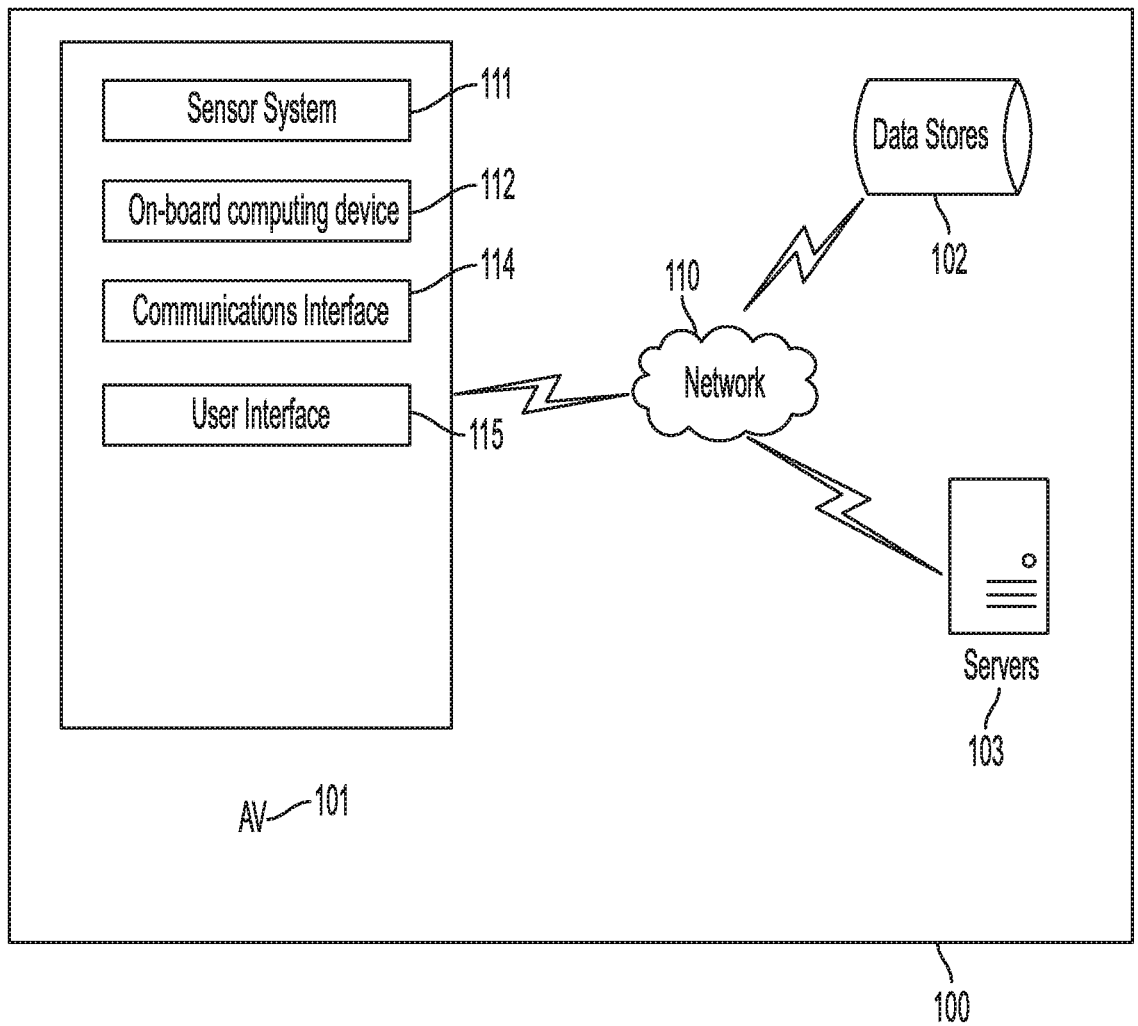
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located. (As used in this document, the term "object" may refer to a stationary object, such as a building or street sign, as well as a moving actor, such as a pedestrian or other vehicle.) Generally, LIDAR system is a device that incorporates optical remote sensing technology that can measure distance to a target and/or other properties of a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LIDAR systems for collecting data pertaining to the surface may be included in systems other than the autonomous vehicle 101 such as, without limitation, other vehicles (autonomous or driven), robots, satellites, etc.

Figure 2:
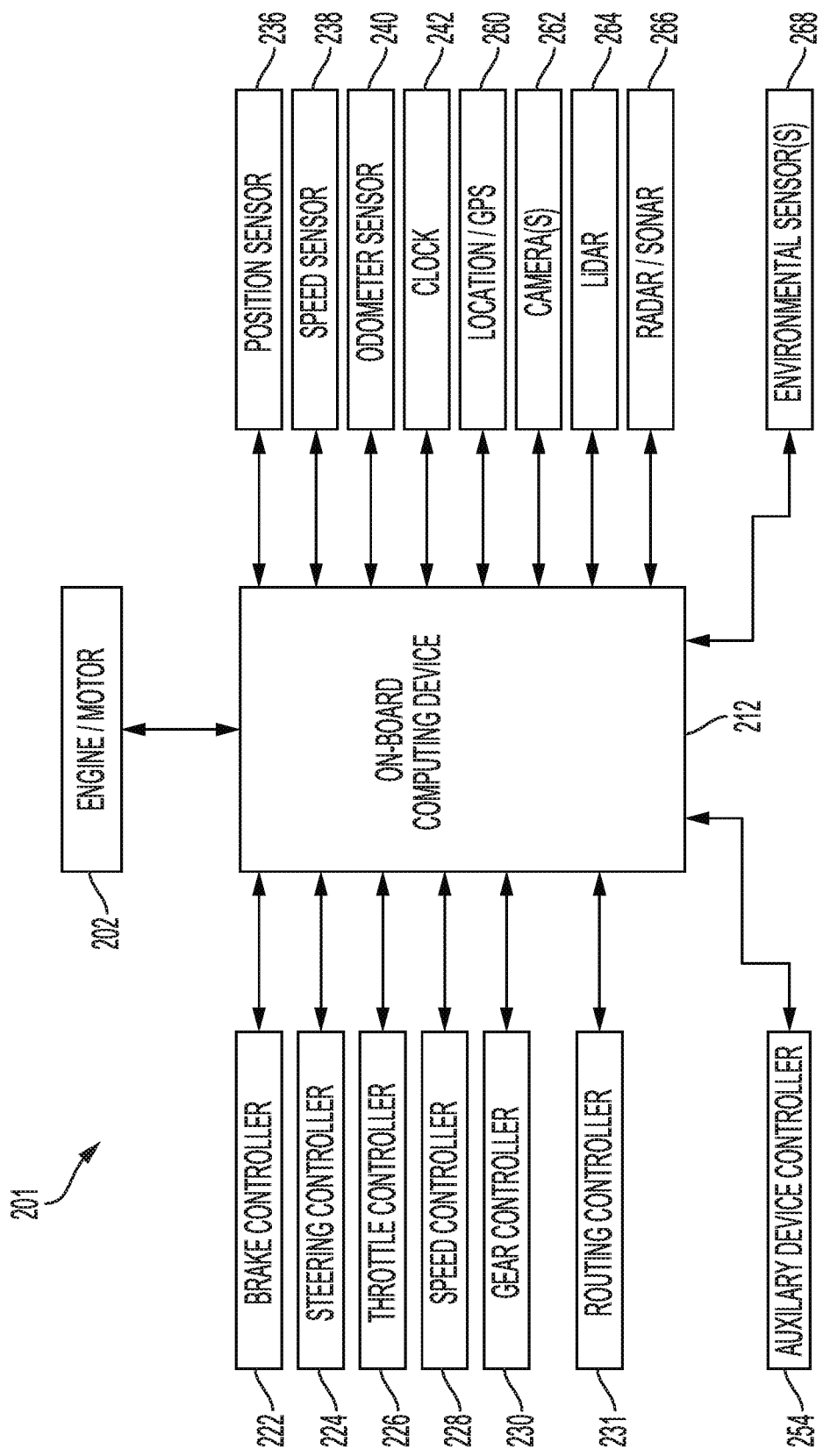
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LIDAR sensor system 264; and/or a radar and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries and other objects, while actors may include other vehicles, pedestrians, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified actors in the environment, the current state of the actor. The state information may include, without limitation, for each actor: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more actors. For example, the on-board computing device 212 may predict the future locations, trajectories, and/or actions of the actors based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an actor is a vehicle and the current driving environment includes an intersection, the on-board computing device 212 may predict whether the actor will likely move straight forward or make a turn. If the perception data indicates that the intersection has no traffic light, the on-board computing device 212 may also predict whether the vehicle may have to fully stop prior to enter the intersection.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate actors and other perception data, the on-board computing device 212 can determine a motion plan for the autonomous vehicle 201 that best navigates the autonomous vehicle relative to the actors at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
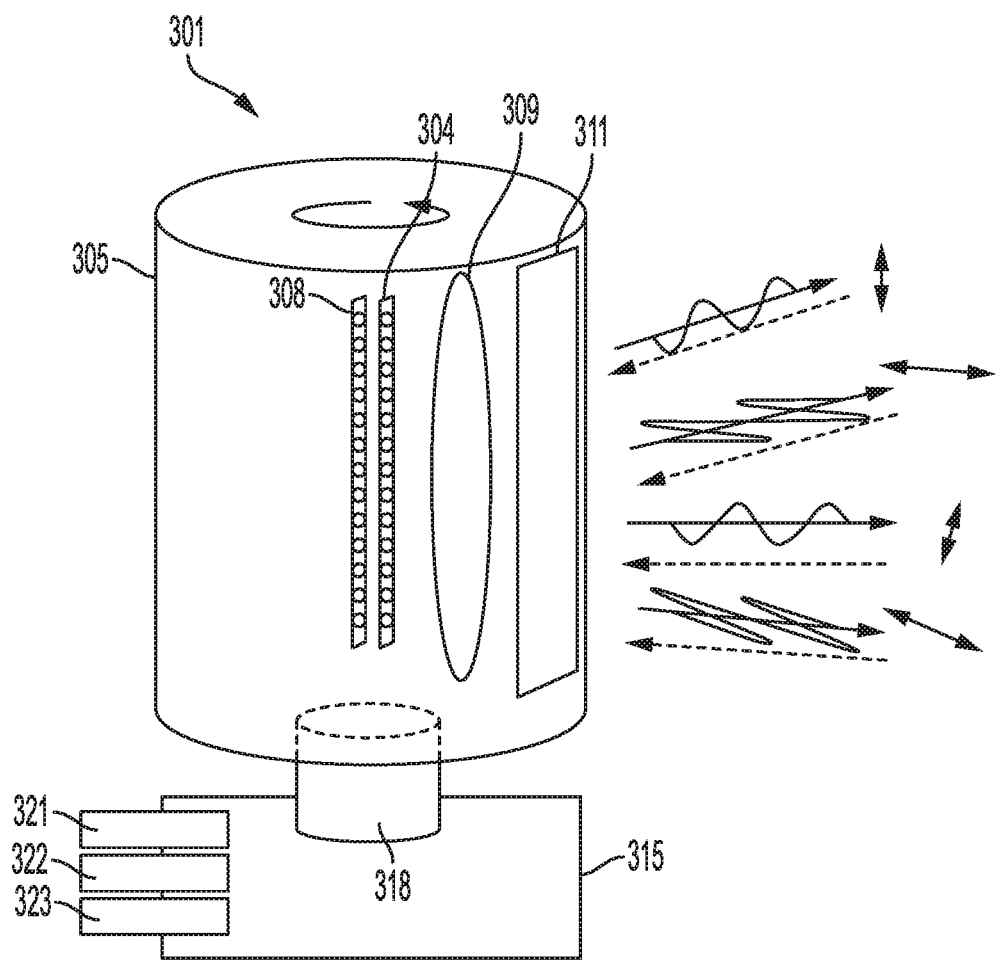
FIG. 3 shows an example LiDAR system.

FIG. 3 shows an example LiDAR system 301 as may be used in various embodiments. As shown in FIG. 3, the LiDAR system 301 includes a housing 305 which may be rotatable 360° about a central axis such as hub or axle 318. The housing may include an emitter/receiver aperture 311 made of a material transparent to light. Although the example shown in FIG. 3 has a single aperture, in various embodiments, multiple apertures for emitting and/or receiving light may be provided. Either way, the system can emit light through one or more of the aperture(s) 311 and receive reflected light back toward one or more of the aperture(s) 311 as the housing 305 rotates around the internal components. In an alternative embodiment, the outer shell of housing 305 may be a stationary dome, at least partially made of a material that is transparent to light, with rotatable components inside of the housing 305.

Inside the rotating shell or stationary dome is a light emitter system 304 that is configured and positioned to generate and emit pulses of light through the aperture 311 or through the transparent dome of the housing 305 via one or more laser emitter chips or other light emitting devices. The emitter system 304 may include any number of individual emitters, including for example 8 emitters, 64 emitters or 128 emitters. The emitters may emit light of substantially the same intensity, or of varying intensities. The individual beams emitted by 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and detector 308 would rotate with the rotating shell, or they would rotate inside the stationary dome of the housing 305. One or more optical element structures 209 may be positioned in front of the light emitting unit 304 and/or the detector 308 to serve as one or more lenses or waveplates that focus and direct light that is passed through the optical element structure 309.

One or more optical element structures 309 may be positioned in front of the mirror 302 to focus and direct light that is passed through the optical element structure 309. As shown below, the system includes an optical element structure 309 positioned in front of the mirror 303 and connected to the rotating elements of the system so that the optical element structure 309 rotates with the mirror 302. Alternatively or in addition, the optical element structure 309 may include multiple such structures (for example lenses and/or waveplates). Optionally, multiple optical element structures 309 may be arranged in an array on or integral with the shell portion 311.

Optionally, each optical element structure 309 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 321 to power the laser emitter unit 304, a motor 303, and electronic components. The LiDAR system will also include an analyzer 315 with elements such as a processor 322 and non-transitory computer-readable memory 323 containing programming instructions that are configured to enable the system to receive data collected by the light detector unit, analyze it to measure characteristics of the light received, and generate information that a connected system can use to make decisions about operating in an environment from which the data was collected. Optionally, the analyzer 315 may be integral with the LiDAR system 301 as shown, or some or all of it may be external to the LiDAR system and communicatively connected to the LiDAR system via a wired or wireless communication network or link.

Figure 4:
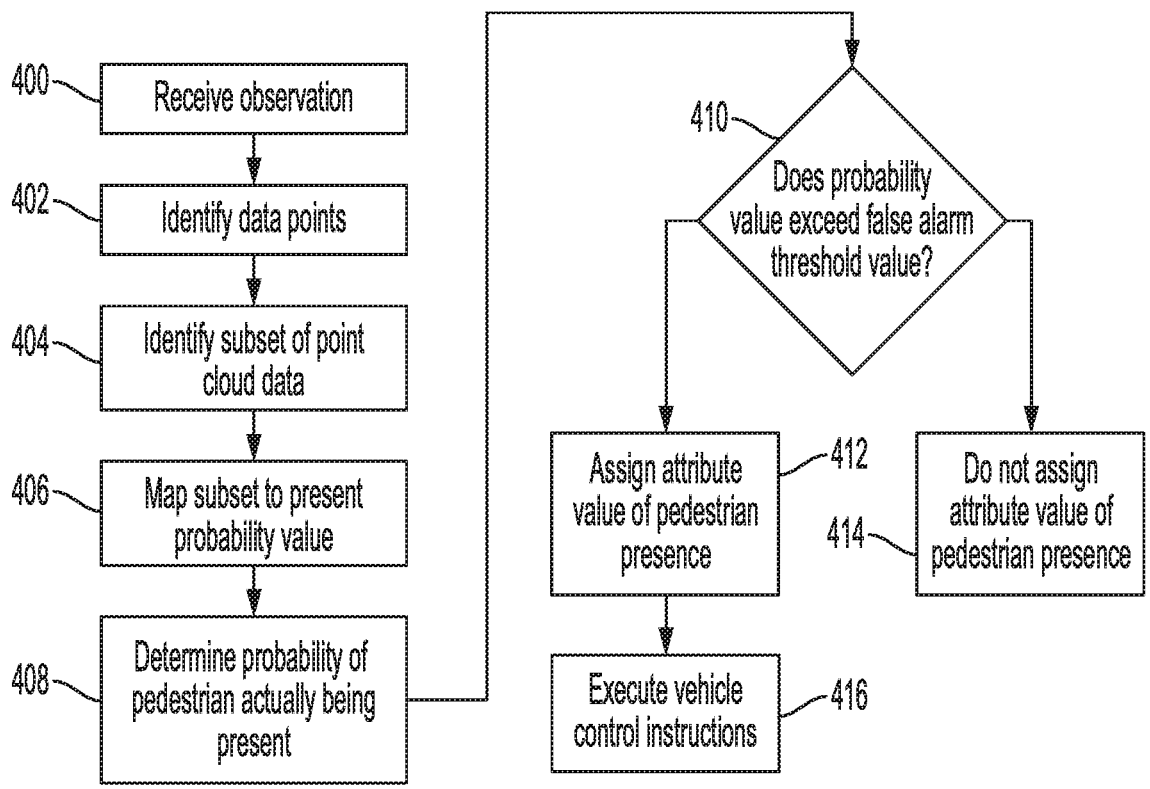
FIG. 4 illustrates a flow chart of an example method of estimating pedestrian presence.

FIG. 4 illustrates a flow chart of an example method of estimating pedestrian presence according to an embodiment. As illustrated by FIG. 4, point cloud data may be received 400. Point cloud data refers to a set of data points in space. In various implementations, one or more data points of a point cloud may be generated by and/or received from one or more sensors of a perception subsystem of an autonomous vehicle which may measure points on an external surface of one or more objects that are in proximity. At least a portion of the received point cloud data may be associated with an object that was detected in one or more frames by an autonomous vehicle.

One or more data points of point cloud data may include an estimated object type label and/or one or more attribute labels associated with an object. The attribute value may be binary indicating whether the attribute was detected as being present. Attributes will be discussed later in this disclosure, but an example of an attribute is whether a pedestrian is likely to enter a frame. For example, a person may be located within a parked car object, and may enter an upcoming frame as a pedestrian if the person exits the car. For example, an attribute value of '0' for an 'PEDESTRIAN_PRESENT' attribute may indicate that the object was not detected as having a pedestrian likely to enter a frame with the object, while an attribute value of '1' for the attribute may indicate that the object was detected as being likely to have a pedestrian likely to enter a frame with the object.

Referring back to FIG. 4, the system may identify 402 one or more data points from the point cloud data associated with a likelihood of a pedestrian entering a scene. A pedestrian may be entering an upcoming scene but not explicitly detected or tracked as a pedestrian by the autonomous vehicle. Even though an autonomous vehicle may not explicitly detect the presence of a pedestrian, it still may infer that a pedestrian is likely to enter a scene in certain situations and respond with an appropriate level of caution. For example, an autonomous vehicle may determine that a pedestrian is likely to be within or near a parked vehicle, such as, for example, a vehicle that is parked on a side of a street. As another example, an autonomous vehicle may determine that a pedestrian is likely to enter a scene when it detects an open door of a vehicle. As yet another example, an autonomous vehicle may determine that a pedestrian is likely to enter a scene when it detects an open rear door of a vehicle such as, for instance, a delivery van. As another example, an autonomous vehicle may determine that a pedestrian is likely present if it detects movement of an object having a certain size, shape, object label and/or attribute value. For instance, an autonomous vehicle may determine that a pedestrian is likely present if it detects movement associated with a trashcan. As yet another example, an autonomous vehicle may determine that a pedestrian is likely present if it detects a stopped bus or other vehicle that typically provides transport to groups of people (e.g., a shuttle). It is understood that additional and/or alternate situations and/or circumstances may give rise to an autonomous vehicle determining that a pedestrian is likely present.

In various implementations, the system may identify 402 one or more data points by identifying one or more object types and/or attribute values associated with one or more of the data points, and comparing them to a list of object types and/or attribute values that are associated with one or more pedestrians being nearby. For instance, a list of object types and/or attribute values that are associated with one or more pedestrians being nearby may be stored in one or more data stores. An autonomous vehicle may retrieve or access the list from the one or more data stores, and may compare information from one or more identified data points to the list to determine whether any of the identified data points correspond to objects that are likely to have one or more pedestrians nearby.

In various implementations, an autonomous vehicle may identify 404 a subset of point cloud data. The subset may include data points of the point cloud data that are associated with a likelihood of a pedestrian being present within its corresponding object or near the corresponding object. In various embodiments, the subset may include one or more of the data points identified in step 402 above.

In various implementations, the system may map 406 the subset of point cloud data to a present probability value. A present probability value may represent a probability that a pedestrian is present in one or more frames that include the subset of point cloud data. A present probability value may be one that is associated with only the data at the current time. In other words, a present probability value may not take into account historical or past information. The system may perform this mapping using a logistic function. The logistic function may be modeled as the number of data points having a pedestrian label across all data points of a point cloud data set.

Figure 5:
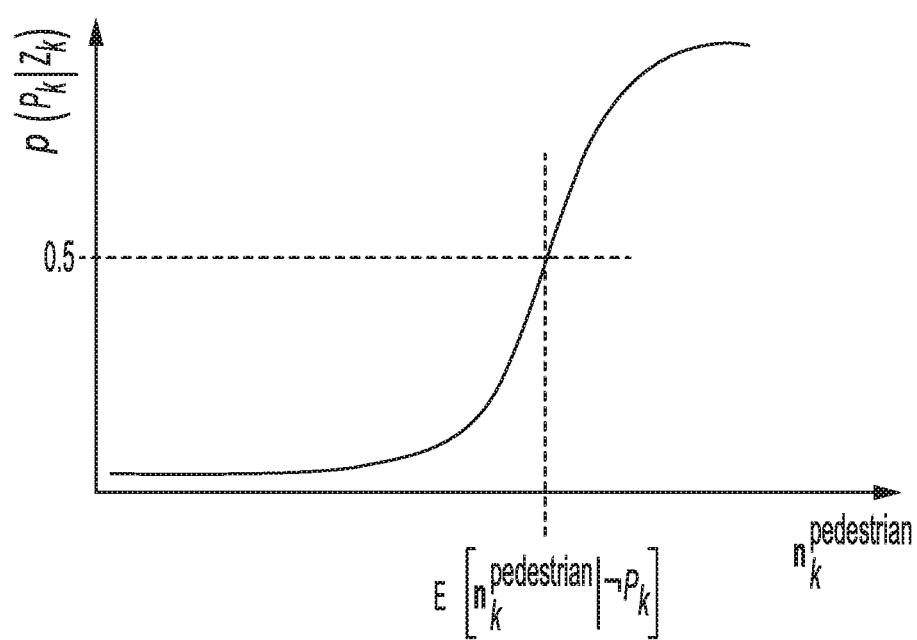
FIG. 5 illustrates an example logistic function that has been tuned.

In various embodiments, the logistic function that is used may be tuned such that the inflection point is set to account for a false alarm rate. For example, the system may tune the logistic function such that the inflection point of the curve is set at a false alarm threshold value. A false alarm threshold value is an expected value of the maximum number of data points that are falsely labeled as a pedestrian when a pedestrian is not present. In various implementations, a false alarm threshold value may be set by and/or adjusted by a system user. FIG. 5 illustrates an example logistic function that has been tuned such that the inflection point of the curve is set at a false alarm threshold value associated with a probability of 0.50. As illustrated by FIG. 5, point count is illustrated on the x-axis while probability is illustrated on the y-axis.

In various embodiments, the system may determine 408 a probability that a pedestrian is actually present in one or more frames that include the subset of point cloud data, where the probability takes into account historical data at one or more past times. The system may determine this probability using a binary Bayes filter. A binary Bayes filter may determine a probability value recursively at each time step. A binary Bayes filter may consider: (1) the probability value from the previous time step (this may be the current probability on the first pass by the Bayes filter); (2) a transition density (i.e., how likely it is that the state will transition from a pedestrian being present to not being present, or from a pedestrian not being present to being present over a one time step; and/or (3) the probability given the data from (2). Since pedestrian presence may change over time (e.g., a pedestrian may be present in one frame but not present in a subsequent frame), pedestrian presence may be considered a dynamic attribute.

An example of a Bayes filter application is described in U.S. patent application Ser. No. 17/066,193, filed Oct. 8, 2020, the disclosure of which is incorporated by reference in its entirety in this disclosure. However, it is understood that other types or applications of Bayes filters may be used within the scope of this disclosure.

Referring back to FIG. 4, the system may determine 410 whether the determined associated probability value is greater than the false alarm threshold value. If the system determines 410 that the determined associated probability value is greater than the false alarm threshold value, the system may assign 412 an attribute value indicative of a pedestrian being present to one or more data points in the subset. For example, the system may assign the data point an attribute value of PEDESTRIAN_PRESENT. Additional and/or alternate attribute values may be used within the scope of this disclosure.

If the system determines 410 that the determined associated probability value does not exceed the false alarm threshold value, the system may not assign 414 one or more data points of the subset an attribute value indicative of a pedestrian being present.

The system may execute 416 one or more vehicle control instructions. The one or more vehicle control instructions may cause an autonomous vehicle to adjust one or more of its driving operations based on one or more attribute values of an object. For example, one or more vehicle control instructions may cause an autonomous vehicle to adjust one or more of its driving operations based on one or more attribute values when it encounters an object associated with the one or more attribute values.

As an example, when an autonomous vehicle encounters an object having an attribute value indicative of a pedestrian being present (e.g., PEDESTRIAN_PRESENT), the autonomous vehicle may apply its brakes and reduce its speed as it approaches the object. As another example, the autonomous vehicle may change its trajectory to provide additional distance between the autonomous vehicle and the object. Additional and/or alternate actions may be performed within the scope of this disclosure.

Figure 6:
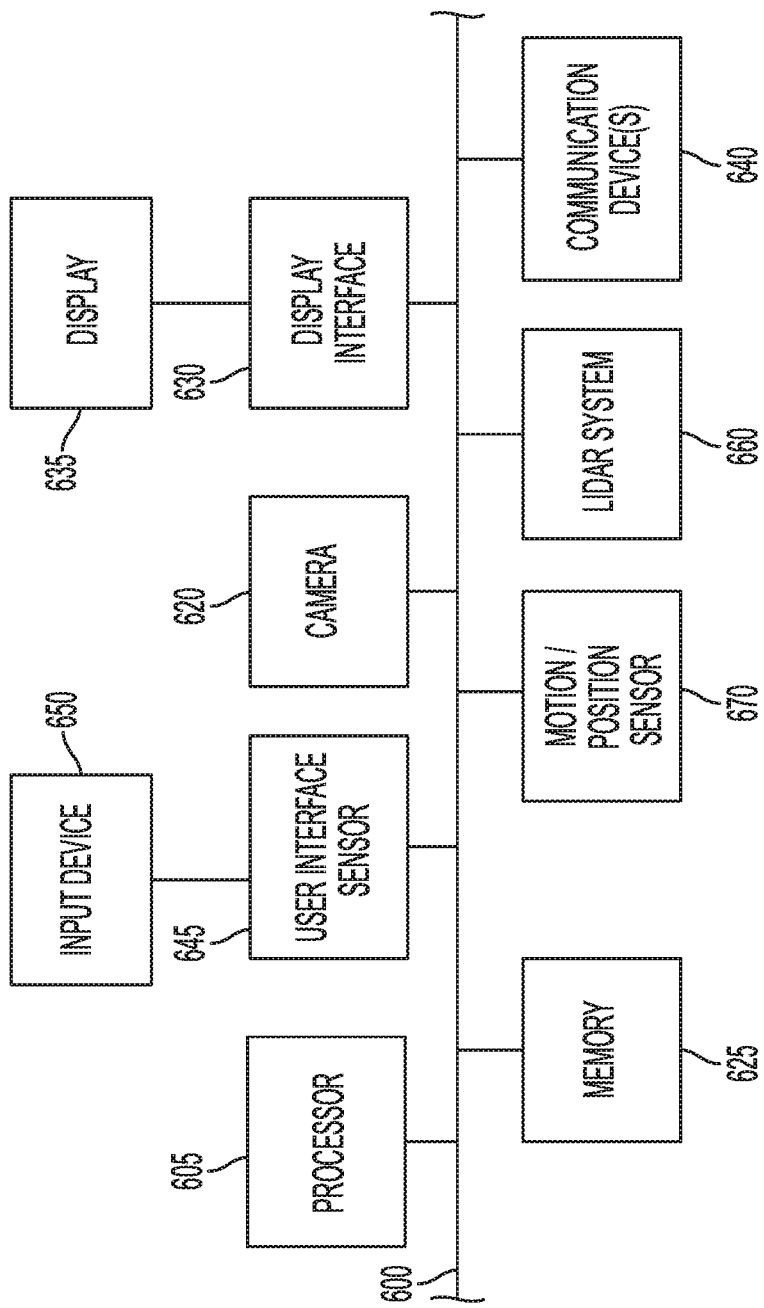
FIG. 6 is a block diagram that illustrates various elements of a possible electronic system, subsystem, controller and/or other component of an AV, and/or external electronic device.

FIG. 6 depicts an example of internal hardware that may be included in any of the electronic components of the system, such as internal processing systems of the AV, external monitoring and reporting systems, or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format, such on an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may receive data from a LiDAR system 660 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, sensor data, and/or other data.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method, comprising:
by one or more electronic devices:
receiving point cloud data comprising one or more data points, wherein the one or more data points are each associated with an object type label for an object that was detected by one or more sensors of an autonomous vehicle;
inferring that an undetected pedestrian will enter a scene by:
using the object type label to identify a subset of the point cloud data comprising one or more of the one or more data points that are associated with a likelihood that the detected object has a pedestrian therein or nearby;
using a logistic function to obtain a first probability value representing a probability that a pedestrian is present in at least one frame that includes the subset of the point cloud data;
obtaining a second probability value based on a transition density indicating how likely it is that a state will transition (i) from a pedestrian being present to pedestrian not being present or (ii) from a pedestrian not being present to a pedestrian being present;
generating, based at least in part on the first and second probability values, a third probability value representing a likelihood of the pedestrian actually being present in the at least one frame;
comparing the third probability value to a false alarm threshold value;
in response to the third probability value exceeding the false alarm threshold value, assigning one or more data points of the subset an attribute value indicative of the pedestrian being present; and
executing one or more vehicle control instructions that cause the autonomous vehicle to adjust one or more driving operations based on the attribute value.

2. The method of claim 1, wherein executing the one or more vehicle control instructions that cause the autonomous vehicle to adjust one or more driving operations based on the attribute value comprises executing one or more vehicle control instructions that cause the autonomous vehicle to apply one or more brakes of the autonomous vehicle when the autonomous vehicle approaches an object having the attribute value.

3. The method of claim 1, wherein the first probability value is associated with data at a current time.

4. The method of claim 1, further comprising tuning the logistic function such that an inflection point is set to the false alarm threshold value.

5. The method of claim 1, wherein the false alarm threshold value is specified by a user.

6. The method of claim 1, wherein determining the third probability value comprises applying a binary Bayes filter.

7. A system, comprising:
an electronic device; and
a computer-readable storage medium comprising one or more programming instructions that, when executed, cause the electronic device to:
receive point cloud data comprising one or more data points, wherein the one or more data points are each associated with an object type label for an object that was detected by one or more sensors of an autonomous vehicle;
infer that an undetected pedestrian will enter a scene by:
using the object type label to identify a subset of the point cloud data comprising one or more of the one or more data points that are associated with a likelihood that the detected object has a pedestrian therein or nearby,
using a logic function to obtain a first probability value representing a probability that a pedestrian is present in at least one frame that includes the subset of the point cloud data,
obtaining a second probability value based on a transition density indicating how likely it is that a state will transition (i) from a pedestrian being present to pedestrian not being present or (ii) from a pedestrian not being present to a pedestrian being present;
generating, based at least in part on the first and second probability values, a third probability value representing a likelihood of the pedestrian actually being present in the at least one frame,
comparing the third probability value to a false alarm threshold value;
in response to the third probability value exceeding the false alarm threshold value, assign one or more data points of the subset an attribute value indicative of the pedestrian being present; and
cause the electronic device to execute one or more vehicle control instructions that cause the autonomous vehicle to adjust one or more driving operations based on the attribute value.

8. The system of claim 7, wherein the one or more programming instructions, that, when executed, cause the electronic device to execute the one or more vehicle control instructions that cause the autonomous vehicle to adjust one or more driving operations based on the attribute value comprise one or more programming instructions that, when executed, cause the electronic device to execute one or more vehicle control instructions that cause the autonomous vehicle to apply one or more brakes of the autonomous vehicle when the autonomous vehicle approaches an object having the attribute value.

9. The system of claim 7, wherein the first probability value is associated with data at a current time.

10. The system of claim 7, wherein the computer-readable storage medium further comprises one or more programming instructions that, when executed, cause the electronic device to tune the logistic function such that an inflection point is set to the false alarm threshold value.

11. The system of claim 7, wherein the false alarm threshold value is specified by a user.

12. The system of claim 7, wherein the one or more programming instructions that, when executed, cause the electronic device to determine the third probability value comprise one or more programming instructions that, when executed, cause the electronic device to apply a binary Bayes filter.

13. A non-transitory computer-readable medium that stores instructions that is configured, when executed by at least one computing device, to cause the at least one computing device to perform operations comprising:
receiving point cloud data comprising one or more data points, wherein the one or more data points are each associated with an object type label for an object that was detected by one or more sensors of an autonomous vehicle;
inferring that an undetected pedestrian will enter a scene by:
using the object type label to identify a subset of the point cloud data comprising one or more of the one or more data points that are associated with a likelihood that the detected object has a pedestrian therein or nearby;
using a logistic function to obtain a first probability value representing a probability that a pedestrian is present in at least one frame that includes the subset of the point cloud data;
obtaining a second probability value based on a transition density indicating how likely it is that a state will transition (i) from a pedestrian being present to pedestrian not being present or (ii) from a pedestrian not being present to a pedestrian being present;
generating, based at least in part on the first and second probability values, a third probability value representing a likelihood of the pedestrian actually being present in the at least one frame;
comparing the third probability value to a false alarm threshold value;
in response to the third probability value exceeding the false alarm threshold value, assigning one or more data points of the subset an attribute value indicative of the pedestrian being present; and
executing one or more vehicle control instructions that cause the autonomous vehicle to adjust one or more driving operations based on the attribute value.

14. The non-transitory computer-readable medium of claim 13, wherein the one or more one or more driving operations of the autonomous vehicle are caused to be adjusted by executing one or more vehicle control instructions that cause the autonomous vehicle to apply one or more brakes of the autonomous vehicle when the autonomous vehicle approaches an object having the attribute value.

15. The non-transitory computer-readable medium of claim 13, wherein the current probability value is associated with data at a current time.

16. The non-transitory computer-readable medium of claim 13, wherein the at least one computing device further caused to tune the logistic function such that an inflection point is set to the false alarm threshold value.

17. The non-transitory computer-readable medium of claim 13, wherein the false alarm threshold value is specified by a user.

* * * * *